UNITED STATES PATENT OFFICE.

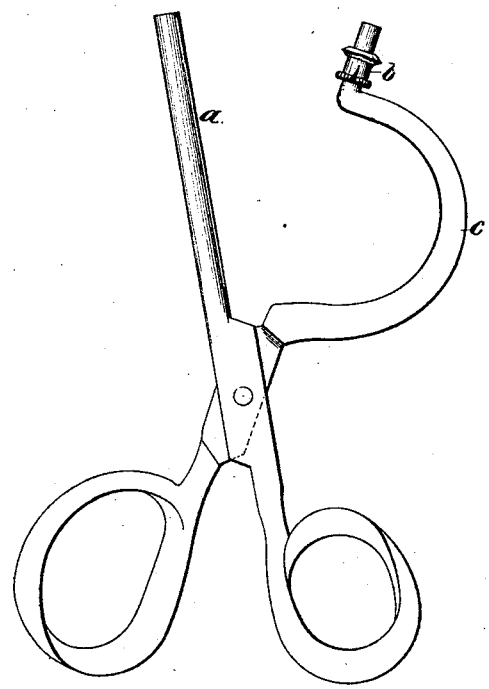

JOHN RIX, OF FORT MADISON, AND PIERCE T. SMITH, OF BURLINGTON, IOWA.

IMPROVEMENT IN DENTAL RUBBER-DAM PUNCHES.

Specification forming part of Letters Patent No. 175,505, dated March 28, 1876; application filed October 22, 1875.

*To all whom it may concern:*

Be it known that we, JOHN RIX, of Fort Madison, in the county of Lee, and State of Iowa, and PIERCE T. SMITH, of Burlington, in the county of Des Moines, and State of Iowa, have invented a new and useful Improvement in Rubber-Dam Punches for Dentists' Use, which improvement is fully set forth in the following specifications, reference being had to the accompanying drawings.

The object of the invention is to cut holes of any desired size in the rubber dam so much used by dentists.

The invention consists of a device in shape like a pair of shears, one blade, $a$, being round and straight; the other blade, $c$, bends outward from near the joint, and, describing an arc, meets, when closed, the blade $a$ at its end. The end of the blade $c$ is bent outward at an angle, so that when closed upon the blade $a$ it is parallel with it. This end is round and supplied with a flanged thimble, $b$, made to slide, and kept in position either by a set-screw or by a slot cut in the end of the thimble, then closed a trifle, and sprung on. The flange of the thimble is made with a sharp cutting-edge.

To operate the instrument, take it in the right hand like a pair of common shears, open the instrument, and, with the left hand, stretch a piece of rubber dam tightly over the end of the blade $a$, close the instrument, which brings the sharp cutting-flange of the thimble $b$ against the rubber dam. The effect is to form a perfectly round hole in the rubber dam. The size of the hole can be varied by moving the thimble, a smaller hole being made by moving the cutter toward the end, and a larger hole being made by moving it from the end.

We claim—

In an instrument for punching rubber dams, the combination of the straight blade $a$, the curved blade $c$, carrying an adjustable flanged cutting-thimble, all as and for the purposes described.

JOHN RIX.
PIERCE T. SMITH.

Witnessed by us:
THEODOR NIEMANN,
R. L. COCHRAN.